United States Patent
Nakamura et al.

(10) Patent No.: US 9,295,967 B2
(45) Date of Patent: Mar. 29, 2016

(54) NITROGEN-FREE OZONE GENERATING UNIT

(75) Inventors: Noriyuki Nakamura, Tokyo (JP); Yoichiro Tabata, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 14/349,240

(22) PCT Filed: Oct. 4, 2011

(86) PCT No.: PCT/JP2011/072817
§ 371 (c)(1),
(2), (4) Date: Apr. 2, 2014

(87) PCT Pub. No.: WO2013/051097
PCT Pub. Date: Apr. 11, 2013

(65) Prior Publication Data
US 2014/0255256 A1  Sep. 11, 2014

(51) Int. Cl.
*B01J 19/08* (2006.01)
*C01B 13/11* (2006.01)

(52) U.S. Cl.
CPC .............. *B01J 19/087* (2013.01); *C01B 13/11* (2013.01); *B01J 2219/0803* (2013.01); *B01J 2219/0892* (2013.01); *C01B 2201/20* (2013.01); *C01B 2201/32* (2013.01); *C01B 2201/70* (2013.01)

(58) Field of Classification Search
CPC ............. B01J 19/087; B01J 2219/0803; B01J 2219/0892; B01J 35/004; C01B 2201/20; C01B 2201/32; C01B 2201/70; C01B 13/11; C01B 2201/12; C01B 2201/34; C01B 2201/60; C01B 2201/64; C01B 2201/80; C01B 2201/82; C01B 2201/90
See application file for complete search history.

(56) References Cited

U.S. PATENT DOCUMENTS 5,377,215 A * 12/1994 Das et al. .......................... 372/57
5,520,893 A *  5/1996 Kasting et al. ................. 422/305
(Continued)

FOREIGN PATENT DOCUMENTS

| CN | 101496215 | 7/2009 |
|----|-----------|--------|
| EP | 1 905 512 | 4/2008 |

(Continued)

OTHER PUBLICATIONS

International Search Issues Jan. 17, 2012 in PCT/JP11/072817 Filed Oct. 4, 2011.

(Continued)

*Primary Examiner* — Xiuyu Tai
(74) *Attorney, Agent, or Firm* — Oblon, McClelland, Maier & Neustadt, L.L.P.

(57) ABSTRACT

In the present invention, a nitrogen-free ozone generating unit integrates a plurality of functional means into a single package unit, the functional means including a nitrogen-free ozone generator that is cooled to a low temperature, an ozone power source, a MFC, an APC, a heat insulating cooling water inlet pipe, and a heat insulating cooling water outlet pipe. In the nitrogen-free ozone generator, a heat insulating layer made of a heat insulating material such as an insulator is formed to cover substantially the entire surface of an ozone generator outer frame. A cooling water system is configured to set the temperature of cooling water, which is supplied to the nitrogen-free ozone generator through the heat insulating cooling water inlet pipe, to 5° C. or less and to thereby cool the nitrogen-free ozone generator.

10 Claims, 9 Drawing Sheets

(56) References Cited

U.S. PATENT DOCUMENTS

| | | | |
|---|---|---|---|
| 7,198,765 B2* | 4/2007 | Tabata et al. | ............ 422/186.07 |
| 7,382,087 B2 | 6/2008 | Tabata et al. | |
| 7,892,502 B2 | 2/2011 | Berkman et al. | |
| 8,480,862 B2 | 7/2013 | Berkman et al. | |
| 8,500,874 B2 | 8/2013 | Tabata et al. | |
| 8,603,692 B2 | 12/2013 | Yamashita et al. | |
| 8,608,832 B2 | 12/2013 | Tabata et al. | |
| 2004/0076560 A1 | 4/2004 | Tabata et al. | |
| 2004/0223893 A1 | 11/2004 | Tabata et al. | |
| 2006/0049738 A1* | 3/2006 | Tabata et al. | ............... 313/362.1 |
| 2008/0245659 A1 | 10/2008 | Matsuno | |
| 2010/0162752 A1 | 7/2010 | Tabata et al. | |
| 2011/0052483 A1 | 3/2011 | Tabata et al. | |
| 2013/0291718 A1 | 11/2013 | Tabata et al. | |

FOREIGN PATENT DOCUMENTS

| | | |
|---|---|---|
| JP | 51-30595 | 3/1976 |
| JP | 60 86008 | 5/1985 |
| JP | 01-208305 | 8/1989 |
| JP | 9 142811 | 6/1997 |
| JP | 11-092118 | 4/1999 |
| JP | 2004-142963 | 5/2004 |
| JP | 2008 143729 | 6/2008 |
| JP | 2009 500855 | 1/2009 |
| KR | 10-2006-0012568 | 2/2006 |
| TW | 200530120 | 9/2005 |
| WO | 2005 080263 | 9/2005 |
| WO | WO 2008/004278 A1 | 1/2008 |
| WO | 2009 069774 | 6/2009 |
| WO | 2011 108410 | 9/2011 |

OTHER PUBLICATIONS

International Preliminary Report on Patentability and Written Opinion issued Apr. 17, 2014, in International Application No. PCT/JP2011/072817 (with English translation).

Supplementary European Search Report issued Jun. 26, 2015, in European Patent Application No. 11 87 3749.

* cited by examiner

NITROGEN-FREE OZONE GENERATING UNIT

CROSS-REFERENCE TO RELATED APPLICATIONS

This application is a National Stage of PCT/JP2011/072817 filed on Oct. 4, 2011.

TECHNICAL FIELD

The present invention relates to a nitrogen-free ozone generating unit equipped with a nitrogen-free ozone generator that uses, as a raw material gas, a high-purity oxygen gas in which the amount of nitrogen added is less than several thousand ppm.

BACKGROUND ART

Conventionally, various techniques as follows are widely used. A raw material gas obtained by adding a nitrogen gas in an amount of several thousand ppm or more to an oxygen gas is supplied to an ozone generator to generate a highly concentrated ozone gas, and in the field of semiconductor manufacture, the resulting highly concentrated ozone gas is commonly used in an ozone treatment step such as formation of ozone-oxidized insulating films or ozone cleaning. In the field of semiconductor manufacture or the like, when an ozone gas is supplied to a multi-ozone treatment apparatus including multiple ozone treatment apparatuses, it is generally conceivable to construct an ozone gas supply system (unit) in which a plurality of ozone generating mechanisms (means), each including, for example, an ozone generator, an ozone power source, and a flow rate controller (MFC), are provided in correspondence with a plurality of ozone treatment apparatuses, and the ozone generating mechanisms independently supply an ozone gas to the corresponding ozone treatment apparatuses.

As shown in FIG. 9, conventionally, in order to increase the efficiency of generating an ozone gas by an ozone generator 71 that includes electrodes 71a and 71b and a dielectric 71c and receives power supplied from an ozone power source 72, a typical oxygen gas contains a nitrogen gas of approximately 50 to several thousand ppm. In the case of a high-purity oxygen gas with low nitrogen content (less than 50 ppm), a trace amount (500 ppm or more) of $N_2$ gas is added to the ozone generator together with the high-purity oxygen gas.

If the raw material oxygen gas contains a $N_2$ gas in an amount of 500 ppm or more, highly concentrated ozone is generated by a catalytic reaction of a trace amount of $NO_2$ generated by a discharge reaction shown in FIG. 10. In particular, addition of 500 to 20000 ppm of nitrogen gas increases the efficiency of generating ozone by a catalytic reaction of a trace amount of nitrogen dioxide generated by discharge, resulting in generation of mostly highly concentrated ozone. It has been verified by experiments that a raw material gas with an amount of nitrogen added of 500 to 20000 ppm is an optimal condition in the performance of generating ozone.

As shown in (1) to (3) below, the discharge reaction shown in FIG. 10 allows generation of highly concentrated ozone, using raw material oxygen $O_2$, photoelectric discharge light, and a trace amount of $NO_2$ catalytic gas.

(1) Generation reaction of a trace amount of $NO_2$ gas by discharging

Ionization reaction of nitrogen molecules $N_2 + e \Rightarrow 2N^+$

Generation reaction of $NO_2$ $2N^+ + O_2 + M \Rightarrow NO_2$ (Generation of several ppm to several ten ppm of $NO_2$ gas)

(2) Generation of oxygen atoms O by a catalytic effect of $NO_2$ by discharge light Photodissociation reaction of $NO_2$ $NO_2 + hv \Rightarrow NO + O$ Oxidation reaction of NO $NO + O_2$ (raw material oxygen) $\Rightarrow NO_2 + O$ Through the above two reactions, $NO_2$ acts as a catalyst to generate oxygen atoms Ozone $O_3$ is generated by reaction of a large number of oxygen atoms O generated by the reaction (2) with oxygen gas molecules $O_2$.

(3) Generation of ozone $O_3$ (three-body collision)

$R2; O + O_2 + M \rightarrow O_3 + M$

The reactions (1) to (3) produce highly concentrated ozone.

However, because the raw material oxygen gas contains a large amount of $N_2$ gas, nitric acid and an NOx by-product gas such as $N_2O_5$ and $N_2O$ are also generated, in addition to the ozone gas, by silent discharge in the ozone generator. Specific chemical formulas for the generation of a $NO_X$ by-product gas and nitric acid are as follows.

$N_2 + e \Rightarrow N_2^* + e \Rightarrow N_2 + hv$ (310, 316, 337, 358 nm)

$N_2^*$; excitation of nitrogen
Ultraviolet light caused by a nitrogen gas $H_2O + e \Rightarrow H + OH + e$ (electrolytic dissociation of water vapor)

$N_2 + e \Rightarrow 2N^- + e$ (electrolytic dissociation of nitrogen molecules)

$NO_2 + hv$ (295 to 400 nm) $\Rightarrow NO + O(^3P)$ $H + O_2 + M \Rightarrow HO_2 + M$ $HO_2 + NO \Rightarrow OH + NO_2$ $N_2O_5 + H_2O \Rightarrow 2HNO_3$ $OH + NO_2 + M \Rightarrow HNO_3 + M$ As described above, the $NO_X$ by-product gas and nitric acid are also generated in addition to the ozone gas.

If a large amount of $NO_X$ by-product is generated, nitric acid ($HNO_3$) clusters (water vapor) are generated by reaction of an $NO_X$ gas component and moisture contained in the raw material gas, and an ozonized gas is obtained in which oxygen, an ozone gas, and a trace amount of $NO_X$ gas and nitric acid clusters are mixed. If the trace amount of nitric acid clusters contained is several hundred ppm or more, rust of chromium oxide or the like is deposited on the inner surface of a stainless steel pipe serving as an ozone gas outlet pipe by the nitric acid, and metal impurities are introduced into a clean ozone gas. If such an ozonized gas is used as a reaction gas for semiconductor manufacturing apparatuses, the metal impurities will adversely affect the manufacturing of semiconductor apparatuses, and the trace amount of generated nitric acid clusters will also adversely affect, as a reaction poison, treatments such as "etching treatment of silicon oxide films with ozone," and "cleaning wafers or the like with ozone water" performed by the semiconductor manufacturing apparatuses.

Also, an ozone gas supply system including an ozone generator, an ozone power source, and the like is generally provided with an ozone generator, an ozone power source, a raw material gas piping system that supplies an ozone gas or a raw material gas to the ozone generator via flow rate adjusting means such as a MFC that controls the flow rate of the ozone gas or the raw material gas, pressure adjusting means such as an APC that controls the atmospheric pressure of a gas contained in the ozone generator, an ozone concentration detector that detects the concentration of the ozone gas output from the ozone generator, and output gas piping systems including ozone flow meters, the number of the output gas piping systems corresponding to the number of multiple ozone treatment apparatuses.

However, it is not possible to supply a large amount of highly concentrated ozonized oxygen having a very small amount of $NO_X$ by-product. Moreover, a very large space is required to construct such an ozone generating system provided with multiple ozone treatment apparatuses as described above. In the case of constructing an ozone-gas supply system by performing overall control on the multiple ozone treatment apparatuses, the system becomes large, causing many problems in terms of cost, installation space, and the like, as well as disadvantages in practical use.

Accordingly, an attempt was made to generate ozone using only a high-purity oxygen gas and without including a nitrogen gas in a conventional ozone generator, but the result was that only a small amount of ozone was generated. The reason for this is presumably as follows. Oxygen molecules in the raw material gas have a continuous spectrum of light absorption with ultraviolet light at a wavelength of 245 nm or less (ultraviolet wavelength of 130 to 200 nm), and as a result of the oxygen molecules absorbing excimer light that is ultraviolet light at 245 nm or less, the oxygen molecules are dissociated into oxygen atoms, and ozone is generated by three-body collision of oxygen atoms produced by dissociation, oxygen molecules, and a third material. This fact is known with excimer lamps or the like that emit ultraviolet rays. However, excimer light that is ultraviolet light at 245 nm or less is not emitted by silent discharge at pressures as high as a pressure of 1 atmosphere or more caused primarily by an oxygen gas as in the ozone generator. Therefore, the reaction constant for the reaction process of dissociation of oxygen atoms and ozone generation by silent discharge light is very small, and it seems unlikely that a highly concentrated ozone gas of several % or higher will be generated by the reaction.

Accordingly, as a conventional method for supplying ozone to multiple ozone treatment apparatuses, for example, an ozone gas supply system as disclosed in Patent Literature 1 has been used in which a raw material gas that is a raw material oxygen gas containing a nitrogen gas of several thousand ppm or more, or a raw material gas obtained by forcibly adding a nitrogen gas in an amount of several thousand ppm or more to a raw material oxygen gas is supplied to an ozone generator so as to generate highly concentrated ozone, and in order to supply an ozone gas to a plurality of ozone treatment apparatuses, the capacity of one ozone generator is increased and a piping system for outputting an ozone gas is separated into a plurality of pipes so that an ozone gas having a predetermined concentration and flow rate is output to each of the multiple ozone treatment apparatuses in a stepwise manner.

PRIOR ART DOCUMENT

Patent Document

Patent Literature: Japanese Unexamined Patent Application Publication No. 2009-500855 (FIGS. 2, 3 and 5)

SUMMARY OF INVENTION

Problems to be Solved by Invention

The conventional ozone gas supply system for supplying ozone to multiple ozone treatment apparatuses disclosed in Patent Literature 1 is configured as described above, in which a raw material oxygen gas that contains nitrogen and moisture is supplied, an ozone gas is output from a single ozone generator 71, and a piping system for outputting the ozone gas is separated into pipes. The ozone gas to be output is thus an active gas that contains by-products of oxides of nitrogen, nitric acid clusters, and OH radicals. Thus, there is a problem in that the ozone gas that contains a large amount of metal contaminations produced by overheat or corrosion is supplied due to chemical decomposition and oxidation reactions of a material for output piping with the by-products of oxides of nitrogen, the nitric acid clusters, and the OH radicals.

The present invention has been made to solve the problems as described above, and it is an object of the present invention to provide a nitrogen-free ozone generating unit that includes a nitrogen-free ozone generator capable of generating a highly pure and highly concentrated ozone gas by using only a high-purity oxygen gas in which no nitrogen gas is added to a raw material gas, and that is configured to efficiently cool a discharge portion of the ozone generator by cooling the ozone generator itself to a low temperature and by covering the ozone generator with a heat insulating material, so that more ozone gas is output from the nitrogen-free ozone generator.

Means for Solving Problems

A nitrogen-free ozone generating unit according to the present invention includes a nitrogen-free ozone generator that includes a photocatalytic material for generating ozone on a discharge surface and is configured to generate an ozone gas, an ozone power source supplying high voltage to the nitrogen-free ozone generator, and control means associated with the ozone generator, wherein the control means includes flow rate detection/adjusting means including a mass flow controller (MFC) configured to control a raw-material-gas flow rate supplied to the nitrogen-free ozone generator, and pressure detecting/adjusting means including an auto pressure controller (APC) configured to automatically control an internal pressure that is a pressure inside the nitrogen-free ozone generator, the nitrogen-free ozone generating unit has an integrated structure of the nitrogen-free ozone generator, the ozone power source, and the control means, the nitrogen-free ozone generator further includes a high-voltage terminal configured to receive the high voltage from the ozone power source, a cooling medium inlet/outlet for supplying and discharging a low-temperature cooling medium having a temperature of 15° C. or less that is obtained from outside, a high voltage electrode to which the high voltage is applied via the high-voltage terminal and that has at least one primary surface defined as the discharge surface, a photocatalyst layer made of the photocatalytic material and provided on the discharge surface of the high voltage electrode, a cooling path part that is provided in a vicinity of the high voltage electrode and allows circulation of the cooling medium supplied via the cooling medium inlet/outlet, an accommodating part configured to accommodate therein the high voltage electrode, the photocatalyst layer, and the cooling path, the cooling medium inlet/outlet being formed in a predetermined constituent surface constituting part of a peripheral portion of the accommodating part, and the high-voltage terminal being provided to pass through the peripheral portion of the accommodating part, and a heat insulating layer made of a heat insulating material and formed to cover at least the predetermined constituent surface of the accommodating part.

Advantageous Effects of Invention

In the nitrogen-free ozone generator of the nitrogen-free ozone generating unit according to the present invention, a cooling medium inlet/outlet is formed to serve as a supply inlet and discharge outlet of a low-temperature cooling medium having a temperature of 15° C. or less, and a heat insulating layer made of a heat insulating material is formed to cover a predetermined constituent surface where condensation is likely to occur. Accordingly, the heat insulating layer allows the ozone generator itself to be cooled to a low temperature without being affected by the atmospheric temperature, thus reliably preventing the occurrence of condensation on the predetermined constituent surface. Consequently, it is possible to reliably avoid troubles caused by entrance of moisture condensed on the ozone power source and the control unit that are provided outside the accommodating part of the nitrogen-free ozone generator, and to integrate the ozone generator, the ozone power source, and the control unit as a single unit.

In addition, the above-described heat insulating layer reduces the influence of atmospheric temperature and maintains the interior of the accommodating part at a relatively low temperature, thus improving the photocatalyst effect of the photocatalyst layer. This consequently enhances the ozone generation efficiency and the effect of decomposing ozone and brings about the effect of generating a greater amount of high-quality ozone.

These and other objects, features, aspects, and advantages of the present invention will become more apparent from the following detailed description of the present invention when taken in conjunction with the accompanying drawings.

DESCRIPTION OF EMBODIMENTS

Nitrogen-Free Ozone Generator

Figure 1:
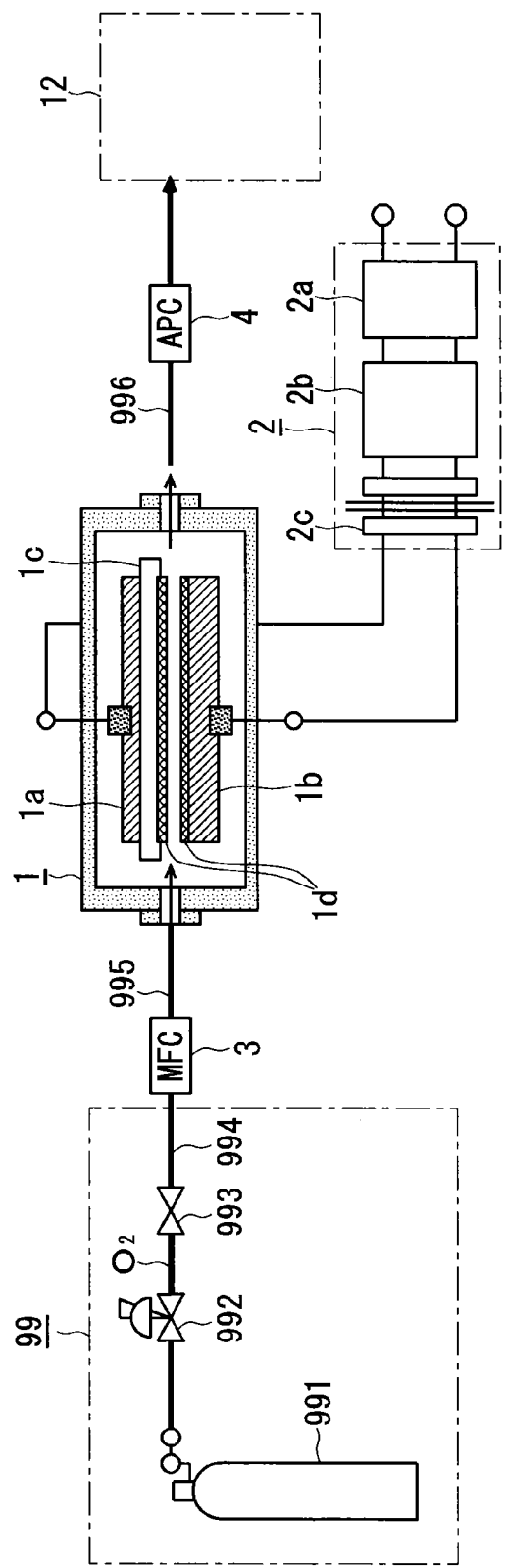
FIG. 1 is a block diagram showing a configuration of a nitrogen-free ozone generator used in an embodiment of the present invention.

A nitrogen-free ozone generator used in an ozone gas supply system according to an embodiment of the present invention will be described with reference to FIGS. 1 to 4. FIG. 1 is a block diagram showing a configuration of a gas system, focusing on a nitrogen-free ozone generator.

Note that, in a strict sense, ozone generators that use a high-purity oxygen raw material gas with an amount of nitrogen added of 10 ppm or more and 1000 ppm or less are referred to as "nitrogen-poor ozone generators," and ozone generators that use a high-purity oxygen raw material gas with an amount of nitrogen added of less than 10 ppm are referred to as "nitrogen-free ozone generators." In this specification, in a broad sense, ozone generators that use a high-purity oxygen raw material gas with a nitrogen content of 1000 ppm or less, including the aforementioned "nitrogen-poor ozone generators," are collectively referred to as "nitrogen-free ozone generators."

Figure 2:
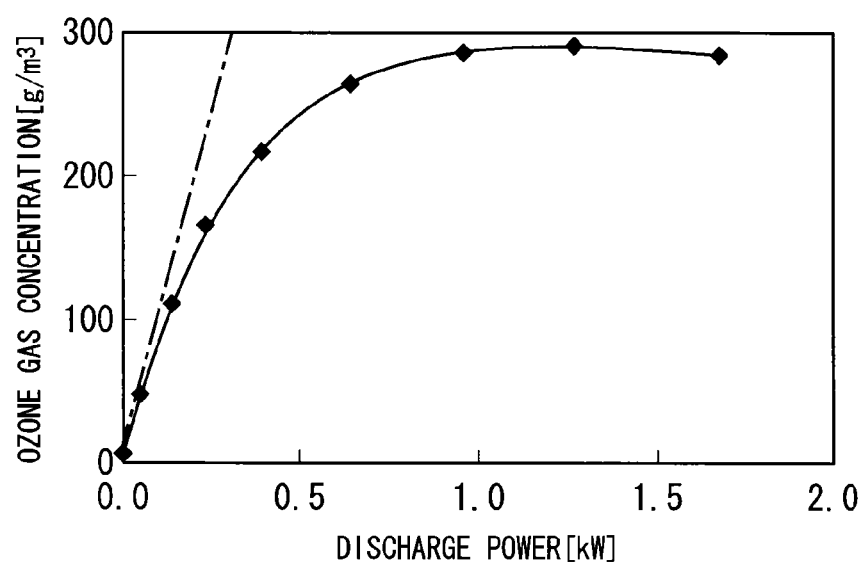
FIG. 2 is a graph showing output ozone concentration characteristics of the nitrogen-free ozone generator shown in FIG. 1.
Figure 3:
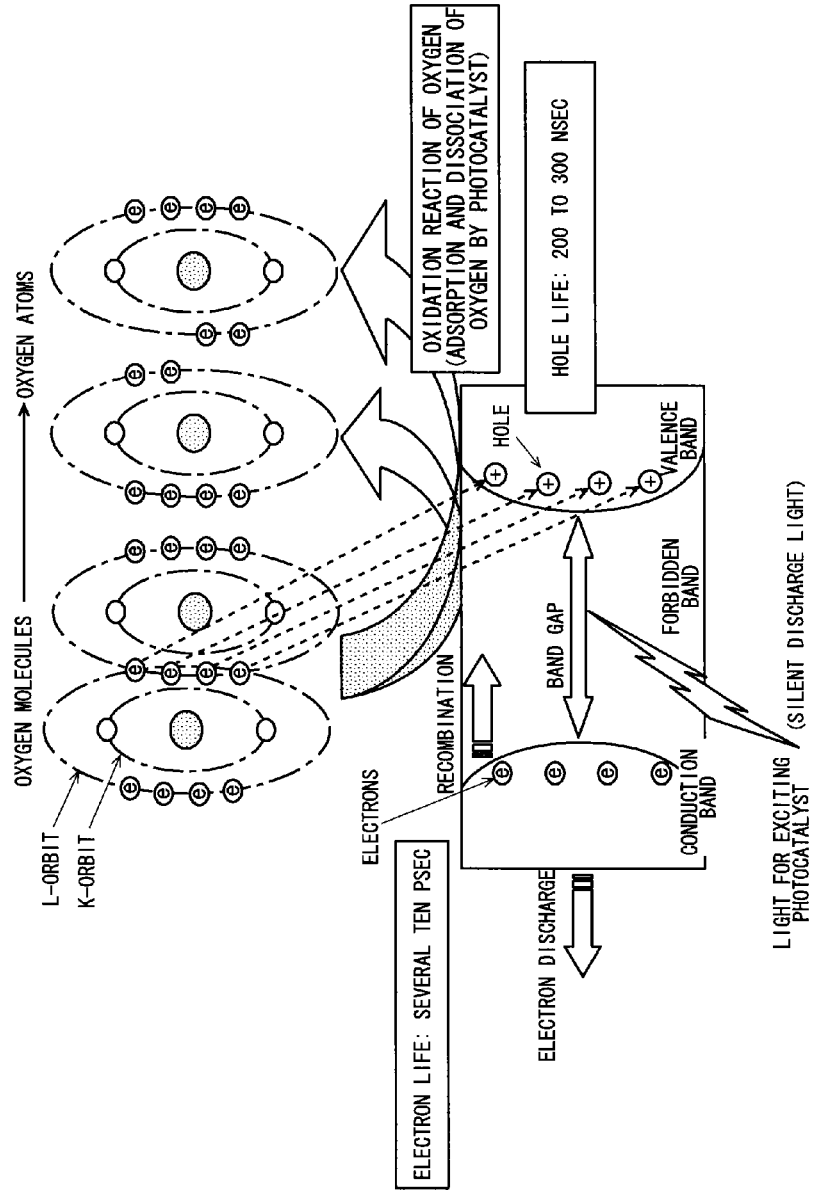
FIG. 3 is a schematic diagram illustrating a mechanism in which oxygen molecules are dissociated into oxygen atoms by oxygen molecules and a photocatalyst at the time of ozone generation.

FIG. 2 is a characteristic diagram showing ozone concentration characteristics of a nitrogen-free ozone generator 1 shown in FIG. 1. FIG. 3 is a schematic diagram illustrating a mechanism in which oxygen molecules are dissociated into oxygen atoms by oxygen molecules and a photocatalyst.

Figure 4:
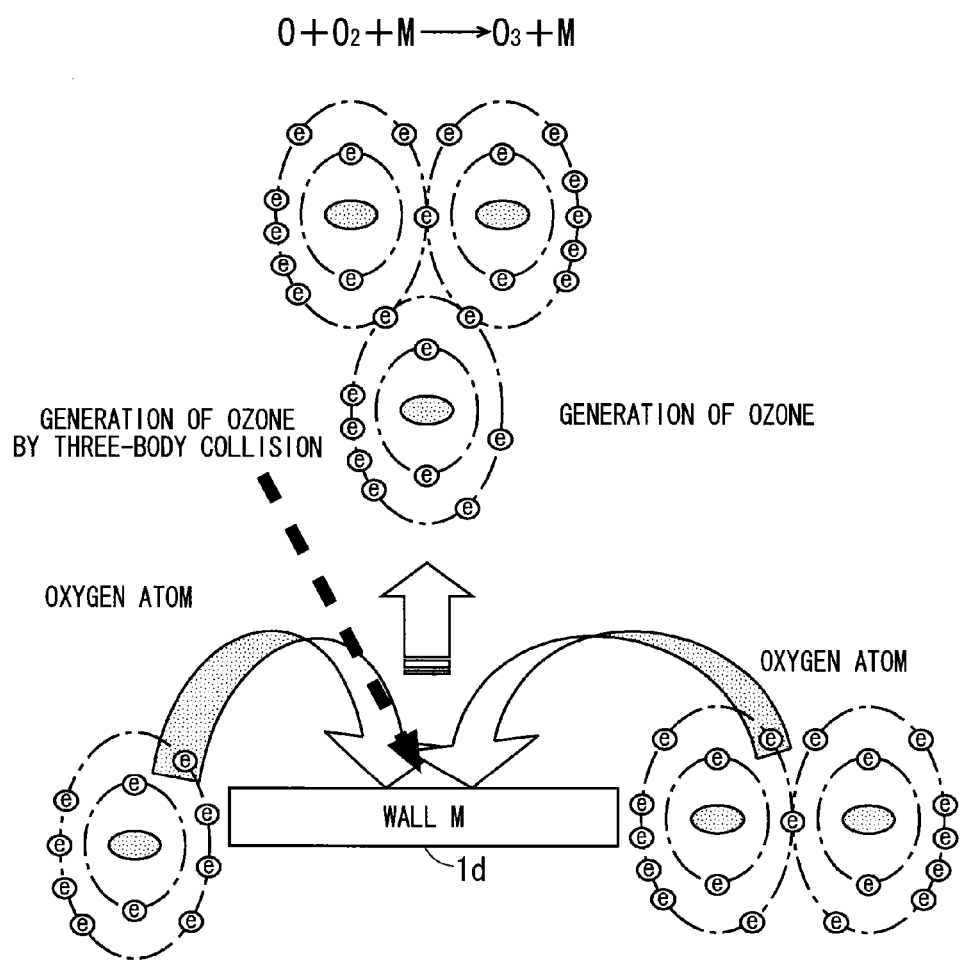
FIG. 4 is a schematic diagram illustrating a mechanism in which ozone is generated by three-body collision of oxygen atoms and oxygen molecules.

FIG. 4 is a schematic diagram illustrating a mechanism in which ozone is generated by three-body collision of oxygen atoms and oxygen molecules generated by the nitrogen-free ozone generator 1. Note that, in this specification, the same reference numerals indicate the same or corresponding parts in the diagrams.

The nitrogen-free ozone generator according to the present invention is effective for applications that require a highly concentrated ozone gas of 200 g/m³ or higher, a clean ozone gas for use in apparatuses such as semiconductor manufacturing apparatuses and cleaning apparatuses, a high-quality nitrogen-free ozone gas that does not contain by-products such as $NO_X$ and OH radicals, and apparatuses having high ozone generation efficiency.

In FIG. 1, a raw material supply system 99 that supplies oxygen (raw material gas) having a purity of 99.99% or higher includes a high-purity oxygen cylinder 991, a pressure reducing valve 992, and an open/close valve 993, and is configured to supply an oxygen gas 994 to the outside. The oxygen gas 994 is then supplied as a raw material gas 995 to the nitrogen-free ozone generator 1 via a MFC 3. The nitrogen-free ozone generator 1 includes electrodes 1a and 1b, a dielectric 1c, and a photocatalyst (layer) 1d. The two electrodes 1a and 1b are opposed to each other, and the dielectric 1c is provided on a surface (discharge surface) of the electrode 1a, the surface facing the electrode 1b. The photocatalyst 1d is applied to facing surfaces of the dielectric 1c and the electrode 1b.

Although not shown in FIG. 1, a gas filter for removing moisture is provided to reduce the amount of moisture contained in the high-purity oxygen supplied from the cylinder to 0.1 ppm or less, and the oxygen gas 994 is supplied as the raw material gas 995 to the nitrogen-free ozone generator 1 via the flow rate controller (MFC) 3 for adjusting the amount of nitrogen- and moisture-free raw material gas in which the amounts of nitrogen and moisture are minimized.

Even if oxygen with a purity of 99.99% or higher, or specifically, high-purity oxygen with a purity of 99.995% is used as the oxygen gas, $N_2$ is inevitably contained in an amount of $151 \times 10^2$ ppb (i.e., 15 ppm), but in order to obtain a high-purity ozone gas, it is desirable to use a raw material oxygen gas containing a smaller amount of $N_2$.

FIG. 3 schematically illustrates an electron coordination structure of the solid in the solid-state electron theory (band gap theory) of a photocatalyst in silent discharge and a mechanism in which oxygen molecules are dissociated. A description will be given of operations and actions of photocatalyst reaction function by a photocatalytic material and discharge light. When a photocatalyst is applied to the wall of an electrode or the like in a silent discharge space, the electron coordination structure of the band gap of the photocatalyst absorbs silent discharge light having an energy greater than or equal to the band gap as shown in FIG. 3. In response to this, in the photocatalyst, electrons escape from a valence band and are transferred (pumped) to a conduction band.

In the valence band from which electrons have been transferred, positive holes (holes) are formed. The electrons transferred to the conduction band move around or are discharged to a discharge region, and then end their life. In other words, the electrons that have been transferred to the conduction band have a very short life, as short as several ten psec. The positive holes formed in the valence band have a long lifetime of 200 to 300 nsec because they remain unless the electrons transferred to the conduction band return to the valence band for recombination Upon quantum contact of the photocatalyst with oxygen molecules, the photocatalyst being in an excited state in which the positive holes are present, the photocatalyst take away shared electrons of the oxygen molecules to physically dissociate the oxygen molecules (oxygen adsorption and dissociation phenomenon (oxidation reaction) by the photocatalyst).

On one hand, a photocatalyst having a band gap of 2.0 to 2.9 eV have a light absorption wavelength of 428 to 620 nm, which is the visible light region. In either of the case of nitrogen-free oxygen or the case of a mixture of oxygen and an argon gas, silent discharge is capable of emitting (discharging) light having a wavelength in the visible light region. Accordingly, it was found that when a photocatalyst with a band gap of 2.0 to 2.9 eV is applied to the electrode surface (wall surface) of the ozone generator, in either of the case of nitrogen-free oxygen or the case of a mixture of oxygen and an argon gas, oxygen can be dissociated by adsorption and dissociation actions of the oxygen gas and the photocatalyst that has been excited as a result of the photocatalyst absorbing discharge light emitted by the silent discharge. Furthermore, as shown in the schematic diagram of FIG. 4, the bond action by three-body collision of the oxygen atoms produced by dissociation, the supplied oxygen molecules (raw material oxygen gas), and a third material is facilitated on the photocatalyst $1d$ (wall M), whereby ozone can be generated.

On the other hand, the silent discharge by a nitrogen gas in the ozone generator is capable of emitting (discharging) light having a wavelength in an ultraviolet region (ultraviolet light of 413 to 344 nm).

Accordingly, in the nitrogen-free ozone generator 1 of the present application in which a photocatalytic material is applied to a discharge surface, a photocatalyst having a band gap of 3.0 to 3.6 eV can be optically excited by silent discharge containing nitrogen, and the excited photocatalyst can generate a high-quality ozone gas by the ability of dissociating oxygen molecules.

Furthermore, silent discharge containing nitrogen can cause photoexcitation of a photocatalyst having a band gap of 3.0 to 3.6 eV, and silent discharge in oxygen can cause photoexcitation of a photocatalyst having a band gap of 2.0 to 2.9 eV. As a result, addition of a trace amount of nitrogen (a poor amount of nitrogen) to oxygen expands the allowable band gap range of the photocatalyst provided on the dielectric or the electrode in the discharge region to a range of 2.0 to 3.6 eV. It is thus possible to use not only oxygen but also the discharge light (ultraviolet light) of nitrogen to facilitate the ozone generation reaction. In other words, when a $N_2$ gas is contained, the ozone generation function according to the effect of the present invention is enhanced.

The photocatalytic material applied to the discharge surface of the ozone generator is one kind of semiconductors, has a band gap specific to semiconductors, and exhibits a greater band gap value than ordinary semiconductor materials. Also, the photocatalytic material is generally an oxide metal material in which a normal metal and oxygen atoms are bonded together. In the crystal structure of the oxide metal material, the bonding between metal atoms and oxygen atoms is not a complete bonding, and it is said that the metal oxide material having a crystal structure having an oxygen deficiency is a material that has a semiconductor effect and a photocatalyst effect.

As for iron oxide ($Fe_2O_3$) or tungsten oxide ($WO_3$) that is a photocatalytic material, to be specific, $Fe_2O_X$ or $WO_X$ is iron oxide or tungsten oxide serving as the photocatalytic material, and iron oxide having a crystal structure where the number X of oxygen atoms bonded is less than 3 (X<3) serves as the photocatalytic material. That is, in the case of bonding oxygen atoms to two iron atoms, up to three oxygen atoms can be bonded, but in order for iron oxide to serve as the photocatalytic material, the crystal structure has an oxygen deficiency portion left in the oxygen bonding.

In the nitrogen-free ozone generator used in the nitrogen-free ozone generating unit, in order to generate highly concentrated ozone by applying a photocatalytic material to the discharge surface to enhance the photocatalyst effect, the discharge surface that discharges electricity and through which an oxygen gas passes is devised to significantly increase the surface area to which the photocatalytic material is applied.

Embodiment

Figure 5:
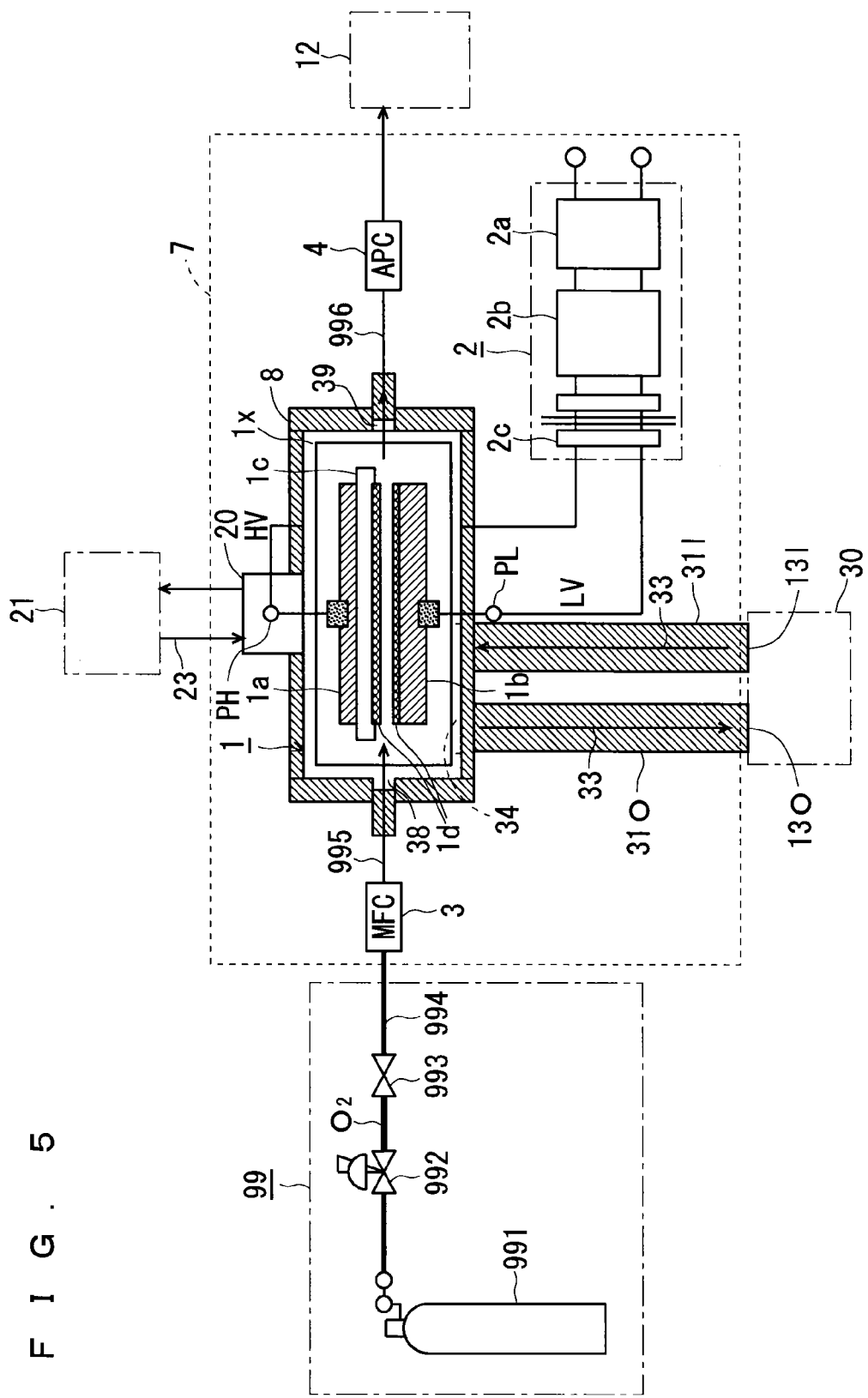
FIG. 5 illustrates a nitrogen-free ozone generating unit 7 and constituent elements in the vicinity thereof according to an embodiment of the present invention.

FIG. 5 illustrates a nitrogen-free ozone generating unit and constituent elements in the vicinity thereof according to an embodiment of the present invention. Note that in FIG. 5, constituent elements that are similar to those shown in FIG. 1 are given the same reference numerals, and a description thereof will be omitted as appropriate. The following description will be given focusing on features of the embodiment.

As shown in FIG. 5, a nitrogen-free ozone generating unit 7 according to the present embodiment includes a nitrogen-free ozone generator 1 having means for generating an ozone gas, an ozone power source 2 having means for supplying a predetermined amount of power to the ozone gas, a MFC 3 having means for controlling a raw-material-gas flow rate Q of a raw material gas flowing into the nitrogen-free ozone generator 1 at a constant value, and an APC 4 having means for controlling the amount of pressure in the nitrogen-free ozone generator 1 at a constant value.

The nitrogen-free ozone generator 1 also includes a high-voltage terminal accommodating part 20 provided outside the ozone generator outer frame 1x and for guiding high voltage HV from the ozone power source 2 into an ozone generator outer frame 1x. The nitrogen-free ozone generator outer frame 1x is a housing serving as an accommodating part for the nitrogen-free ozone generator 1, and accommodates therein a high-voltage electrode 1a, a ground electrode 1b, a dielectric 1c and a photocatalyst 1d, a connecting block 498 (not shown in FIG. 5), and a high-pressure cooling plate 45 (not shown in FIG. 5).

Furthermore, heat insulating cooling water piping 31 (a heat insulating cooling water inlet pipe 31I, and a heat insulating cooling water outlet pipe 31O) for supplying and discharging low-temperature cooling water 33 (cooling medium) to and from the ozone generator outer frame 1× is provided outside the ozone generator outer frame 1×. Also, a high-voltage terminal PH in the high-voltage terminal accommodating part 20 and a ground terminal PL are provided so as to pass through the ozone generator outer frame 1×.

The nitrogen-free ozone generator 1 further has a raw material inlet 38 for supplying the raw material gas 995 obtained via the MFC 3 to the inside of the nitrogen-free ozone generator 1 and an ozone gas outlet 39 for outputting generated ozone gas 996 to the APC 4 located outside, provided in the ozone generator outer frame 1×. In the nitrogen-free ozone generator 1, a cooling water inlet/outlet 34 for receiving input of the low-temperature cooling water 33 (cooling medium) from the heat insulating cooling water inlet pipe 31I and for outputting the low-temperature cooling water 33 to the heat insulating cooling water outlet pipe 31O is also provided in the ozone generator outer frame 1×.

As shown in FIG. 5, the nitrogen-free ozone generating unit 7 integrates a plurality of functional means such as the above-described nitrogen-free ozone generator 1 (including the high-voltage terminal accommodating part 20), the ozone power source 2, the MFC 3, the APC 4, and the heat insulating cooling water piping 31 (31I and 31O) into a single package unit.

A heat insulating layer 8 is made of a heat insulating material such as an insulator and is formed to cover substantially the entire surface of the ozone generator outer frame 1×. That is, the heat insulating layer 8 is formed to cover the periphery of the ozone generator outer frame 1× while ensuring a circulation path to the cooling water inlet/outlet 34, the raw material inlet 38, and the ozone gas outlet 39. However, the heat insulating layer 8 is not formed on the periphery of the high-voltage terminal accommodating part 20. Note that it is desirable that the peripheries of the heat insulating cooling water inlet pipe 31I and the heat insulating cooling water outlet pipe 31O are also covered with the heat insulating layer 8 from the viewpoint of enhancing the heat insulating effect against the low-temperature cooling water 33.

High voltage HV is applied from the ozone power source 2 to the high-voltage electrode 1a via the high-voltage terminal PH in the high-voltage terminal accommodating part 20, and ground voltage LV is applied to the ground electrode 1b via the ground terminal PL.

The high-voltage terminal accommodating part 20 is configured to accommodate the high-voltage terminal PH disposed in a predetermined space capable of air insulation and to be capable of supplying a purge gas 23 from a purge gas system 21 via a purge gas input pipe, which will be described later.

The heat insulating cooling water inlet pipe 31I is provided to input the low-temperature cooling water 33 obtained from a cooling water system 30 to the inside of the nitrogen-free ozone generator 1, and the heat insulating cooling water outlet pipe 31O is provided to return the low-temperature cooling water 33 discharged from the nitrogen-free ozone generator 1 back to the cooling water system 30. Note that the cooling water system 30 sets the temperature of the low-temperature cooling water 33 to 15° C. or less.

Effects

As shown in FIG. 5, the nitrogen-free ozone generator 1 (including the high-voltage terminal accommodating part 20), the ozone power source 2, and control devices (e.g., the MFC 3 and the APC 4) are integrated into a single unit as the nitrogen-free ozone generating unit 7. In the nitrogen-free ozone generating unit 7, when the nitrogen-free ozone generator 1 is cooled to a low temperature with the low-temperature cooling water 33, condensation occurs on the surface of the ozone generator outer frame 1× of the nitrogen-free ozone generator 1 due to a difference in temperature from the atmosphere. If the condensed water droplets adhere to the ozone power source 2 and the control devices such as the MFC 3 and the APC 4, electrical insulation properties will be impaired, causing failure of the ozone power source 2 and the control devices.

However, in the nitrogen-free ozone generating unit 7 of the present embodiment, the heat insulating layer 8 made of a heat insulating material that does not allow passage of moisture and has a low thermal conductivity is formed so as to cover substantially the entire surface of the periphery of the nitrogen-free ozone generator 1. This prevents direct contact of the surface of the ozone generator outer frame 1× of the nitrogen-free ozone generator 1 with the atmosphere and reliably avoids the occurrence of condensation on the surface of the ozone generator outer frame 1×.

Cooling the nitrogen-free ozone generator 1 to a lower temperature increases the ozone generation efficiency and reduces the effect of decomposing generated ozone, bringing about the effect of increasing the amount of ozone obtained. Accordingly, means (the low-temperature cooling water system 30 and the heat insulating cooling water piping 31, etc.) for cooling the nitrogen-free ozone generator 1 to a low temperature are provided. However, in the case where there is a great difference between the cooing temperature for cooling the nitrogen-free ozone generator 1 and the atmospheric temperature and the atmospheric temperature is higher than the cooling temperature, even if the nitrogen-free ozone generator 1 is cooled, the cold air cooled by a low-temperature coolant (cooling water 33) is lost to the atmosphere, and thus it is not possible to sufficiently cool a discharge electrode cell composed of the high-voltage electrode 1a and the ground electrode 1b of the nitrogen-free ozone generator 1. This consequently reduces the ozone generation efficiency and degrades the ozone performance.

However, in the nitrogen-free ozone generating unit 7 of the present embodiment, the heat insulating layer 8 made of a heat insulating material having a low thermal conductivity is formed so as to cover substantially the entire surface of the periphery of the nitrogen-free ozone generator 1. This reliably prevents the phenomenon in which the cold air in the nitrogen-free ozone generator 1 is lost to the atmosphere.

As a result, the effect of cooling the nitrogen-free ozone generator 1 is not impaired by the atmospheric temperature, and therefore the effect of sufficiently enhancing the ozone generation efficiency can be obtained by sufficiently cooling the interior of the nitrogen-free ozone generator 1 (the ozone generator outer frame 1×).

In the nitrogen-free ozone generating unit 7 of the present embodiment, the heat insulating layer 8 is formed so as to cover substantially the entire surface of the peripheral portion of the ozone generator outer frame 1× serving as an accommodating part. It is thus possible to reliably avoid troubles caused by entrance of moisture condensed on the ozone power source 2 and the control means (the MFC 3 and the APC 4) that are provided outside the nitrogen-free ozone generator 1.

Cooling Medium

In the present embodiment, the cooling water 33 is used as a low-temperature cooling medium, but it is also possible to use the following cooling mediums in place of the cooling water 33. Examples include an aqueous solution of ethylene glycol (PRTR) with a coolant temperature of −20° C. to 65° C., hydrofluoropolyether (HFPE) with a coolant temperature of −40° C. to 60° C., and the like.

Temperature of Cooling Water 33

In the present embodiment, the temperature of the cooling water 33 when supplied to the nitrogen-free ozone generator 1 is set to 5° C. or less. The reason is as follows. It is conventionally common to cool the nitrogen-free ozone generator 1 by circulating water having a temperature of 20° C. within the nitrogen-free ozone generator 1, so as to generate ozone.

However, when the nitrogen-free ozone generator 1 is cooled with water having a temperature of 20° C., which is substantially the same as the atmospheric temperature, so as to cause the discharge cell to discharge electricity to generate ozone, the temperature of the cooling water in the downstream of the nitrogen-free ozone generator 1 rises to approximately 30° C., causing the average gas temperature to be 35° C. ($\Delta Tav=5$ degrees). It is also presumed that the instantaneous micro-discharge gas temperature in the micro-discharge space of dielectric barrier discharge also rises by several degrees (° C.) with respect to the average gas temperature, resulting in approximately 37° C. ($\Delta Td=2$ degrees).

If, on the other hand, the temperature of the low-temperature cooling water 33 when supplied to the nitrogen-free ozone generator 1 is set to 5° C., and the nitrogen-free ozone generator 1 is cooled to generate ozone, the temperature of the low-temperature cooling water 33 in the downstream of the nitrogen-free ozone generator 1 rises to only approximately 15° C., and thus the average gas temperature is 20° C. ($\Delta Tav=5$ degrees) so that the instantaneous micro-discharge gas temperature in the micro-discharge space of dielectric barrier discharge can be reduced to 22° C. ($\Delta Td=2$° C.).

Accordingly, by setting the coolant temperature, or in other words, the temperature of the low-temperature cooling water 33 to 5° C. or less, the instantaneous micro-discharge gas temperature in the micro-discharge space of dielectric barrier discharge can be reduced from 37° C. to 22° C. or less as compared to the conventional case of power input for discharge.

As a result, a sustain voltage V* for the dielectric barrier discharge (sparking voltage) increases in proportion to the reduction in the instantaneous micro-discharge gas temperature in the micro-discharge space of dielectric barrier discharge. This increases electric field E in the discharge space and significantly increases the intensity of short-wavelength light of discharge light emitted by the dielectric barrier discharge.

When the intensity of short-wavelength light of the discharge light increases, the photocatalyst effect of the photocatalyst (material) 1d applied to the surfaces of the electrodes 1a and 1b increases significantly, further facilitating the ability of dissociating oxygen gas into oxygen atoms, and increasing the concentration of ozone inevitably generated by three-body collision of the oxygen atoms produced by dissociation and oxygen molecules. Also, the effect of enhancing the generation of ozone is obtained, and at the same time, when the average gas temperature is low, the amount of ozone decomposed by the gas temperature is reduced although very slightly, and thus the effect of increasing the concentration of ozone that can be output is also obtained.

Accordingly, among various types of ozone generators, particularly the nitrogen-free ozone generator 1 is considered to have a significant effect obtained by cooling the nitrogen-free ozone generator 1 with the low-temperature cooling water 33 having a temperature of 5° C. or less.

Figure 6:
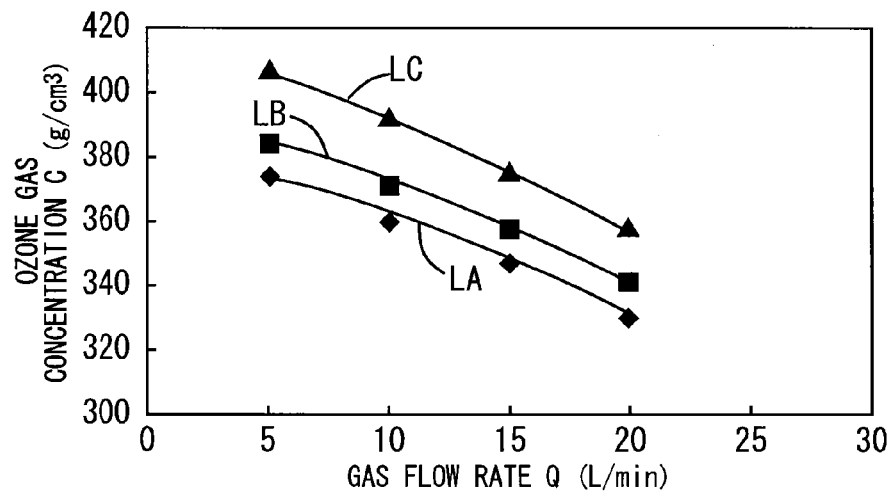
FIG. 6 is a graph showing ozone concentration characteristics of ozone gas concentration with respect to a raw-material-gas flow rate Q.

FIG. 6 is a graph showing ozone concentration characteristics of ozone gas concentration with respect to the raw-material-gas flow rate Q, which is the flow rate of the raw material gas 99S.

In FIG. 6, LA indicates an ozone concentration characteristic of a conventional configuration in which the setting temperature of the cooling water 33 is 20° C. and the heat insulating layer 8 is not provided, LB indicates an ozone concentration characteristic of a configuration in which the setting temperature of the cooling water 33 is 20° C., and the heat insulating layer 8 is provided as shown in FIG. 5, and LC indicates an ozone concentration characteristic of a configuration in which the setting temperature of the cooling water 33 is 5° C., and the heat insulating layer 8 is provided.

It can be seen from FIG. 6 that the ozone concentration characteristics are improved in the order of LA, LB, and LC. That is, FIG. 6 proves that setting the temperature of the cooling water 33 to 5° C. or less and providing the heat insulating layer 8 both provide the effect of improving the ozone concentration characteristics of ozone generated by the nitrogen-free ozone generator 1.

As described above, in the nitrogen-free ozone generating unit 7 of the present embodiment, because the temperature of the cooling water 33 serving as a low-temperature cooling medium at the time of being supplied to the nitrogen-free ozone generator 1 is set to 5° C. or less, the photocatalyst effect of the photocatalyst (layer) 1d is further enhanced, and thereby the concentration of the generated ozone can be further improved.

Heat Insulating Material for Heat Insulating Layer 8

As the heat insulating material for the heat insulating layer 8, it is effective to use a material that does not allow passage of water and moisture and has a much lower thermal conductivity than metals. For example, carbon fiber, ceramic fiber, and Teflon (registered trade mark) fiber that are heat resistant inorganic fibers can be used. A heat insulation board made of, for example, a hard urethane obtained by forming a heat insulating material into a board shape may be used as the heat insulating layer 8.

Effects Obtained by High-Voltage Terminal Accommodating Part 20

Figure 7:
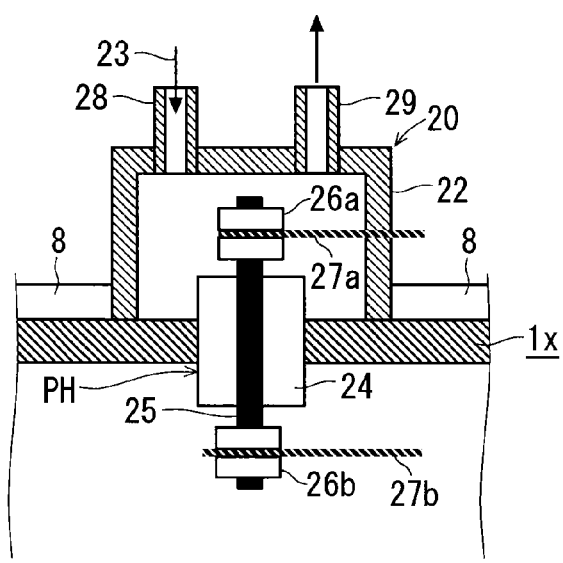
FIG. 7 illustrates the details of a high-voltage supply unit shown in FIG. 5.

FIG. 7 illustrates details of the high-voltage terminal accommodating part 20. As shown in FIG. 7, the high-voltage terminal PH provided in the high-voltage terminal accommodating part 20 includes a high-voltage insulator 24, an electrode bar 25, and nuts 26 (26a, and 26b).

The high-voltage insulator 24 made of an insulating material is provided so as to extend from the inside of the nitrogen-free ozone generator 1 to the inside of a housing 22 of the high-voltage terminal accommodating part 20 through the ozone generator outer frame 1×. That is, the high-voltage insulator 24 is formed to pass through the ozone generator outer frame 1× for separating the inside and outside of the nitrogen-free ozone generator 1 and constitute the high voltage terminal PH.

Then, high voltage HV is applied to the high-voltage electrode 1a of the discharge electrode cell via electric wires 27a and 27b and the electrode bar 25 that is included in the high-voltage insulator 24 and constitutes the high-voltage terminal PH. If the high-voltage insulator 24 is exposed to the atmosphere, and the nitrogen-free ozone generator 1 is cooled to a temperature lower than or equal to the atmospheric temperature, the high-voltage insulator 24 is also cooled, and thus there is concern that condensation may occur on the surface of the high-voltage insulator 24, impairing the electrical insulation properties of the high-voltage insulator 24.

However, the present embodiment is configured such that the high-voltage insulator 24 serving as the high-voltage terminal PH is disposed in the high-voltage terminal accommodating part 20, and the purge gas 23 (a dried gas, or in other words, a low dew point gas such as a nitrogen or inert gas) generated by the purge gas system 21 can be supplied through a purge gas input pipe 28. Accordingly, the purge gas 23 reliably prevents the occurrence of condensation on the surface of the high-voltage insulator 24 due to the high-voltage insulator 24 being cooled. As a result, in the present embodiment, even if the high-voltage insulator 24 provided in the nitrogen-free ozone generator 1 is cooled to a low temperature by reducing the temperature of the ozone generator, no condensation will occur on the surface of the high-voltage insulator 24. The high-voltage insulator 24 thus has the effect of being capable of maintaining good electrical insulation properties.

In the present embodiment, the purge gas 23, which is a dried gas, is constantly supplied to a predetermined space in the housing 22 so that the purge gas 23 is present around the high-voltage insulator 24, preventing the occurrence of condensation on the surface of the high-voltage insulator 24. Besides the above method, condensation on the surface of the high-voltage insulator 24 can be prevented by completely containing a dried gas serving as the purge gas 23 in the housing 22 such that the purge gas 23 is present around the high-voltage insulator 24 without constantly supplying the purge gas 23, or by intermittently supplying the purge gas 23.

As described above, the nitrogen-free ozone generating unit 7 of the present embodiment includes the high-voltage terminal accommodating part 20 capable of supplying the purge gas 23 to a predetermined space in the housing 22 from the purge gas system 21 through the purge gas input pipe 28. Thus, the purge gas 23 having a relatively low dew point and for preventing condensation can be caused to exist around the high-voltage insulator 24. Accordingly, it is possible to reliably prevent the occurrence of condensation on the surface of the high-voltage insulator 24 without compromising the ability of the high-voltage terminal PH to apply the high voltage HV.

Other Embodiments

Figure 8:
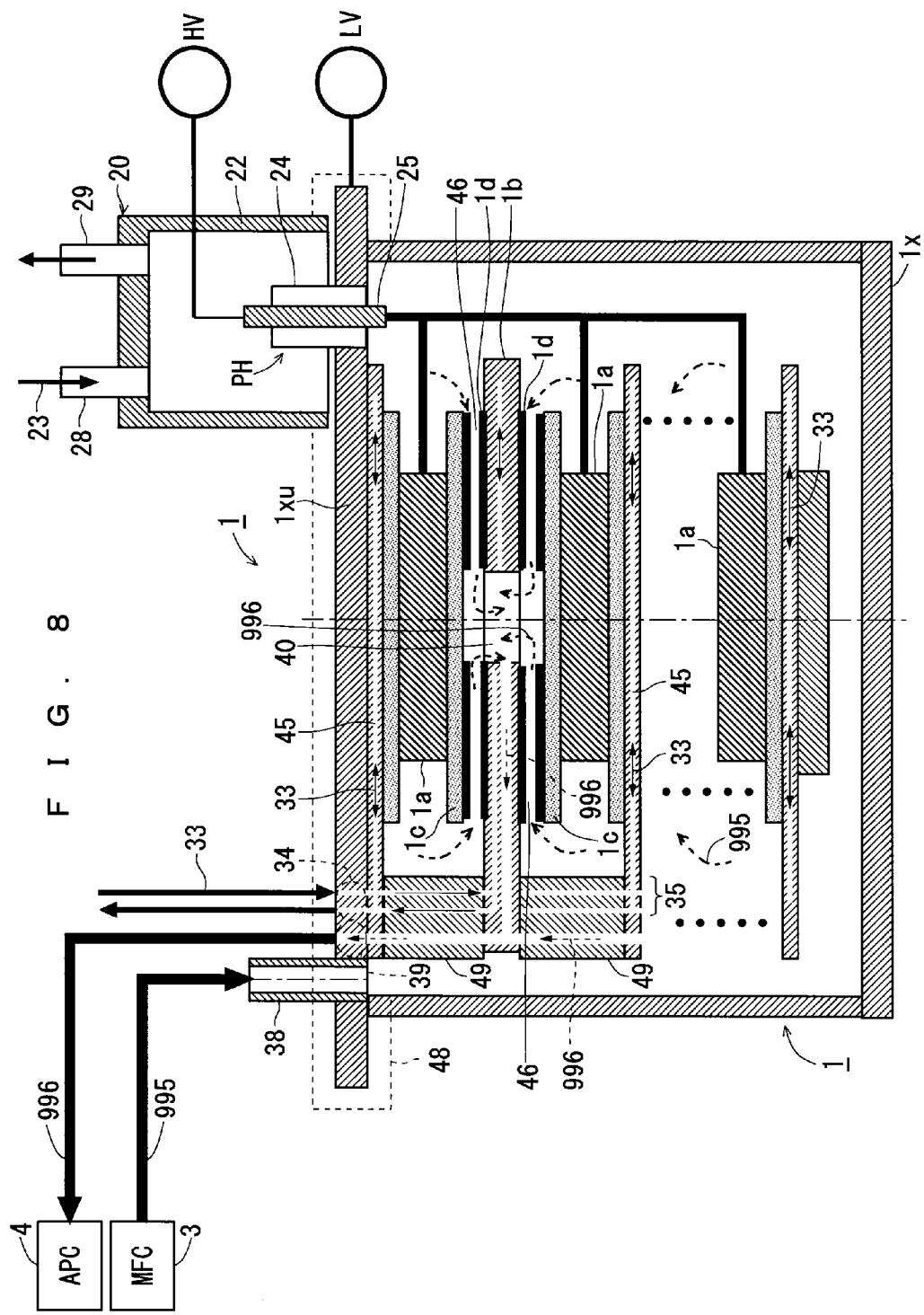
FIG. 8 illustrates the details of the configuration of another nitrogen-free ozone generator.
Figure 9:
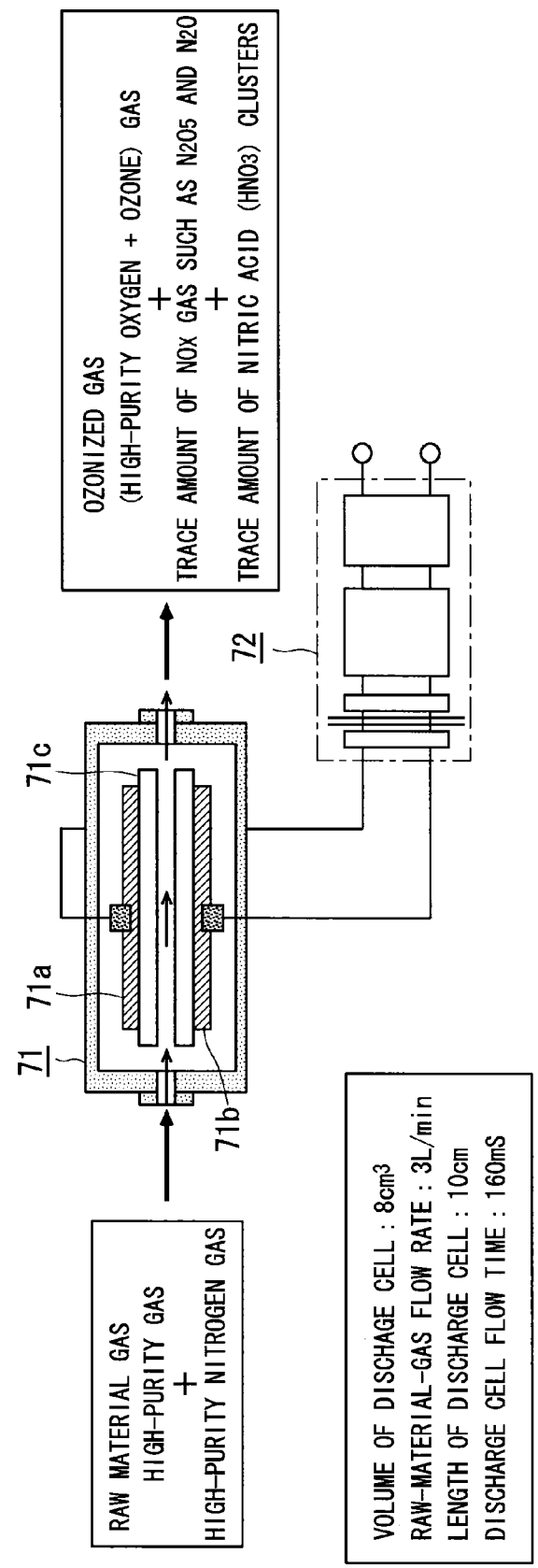
FIG. 9 illustrates a configuration of a conventional ozone generator.
Figure 10:
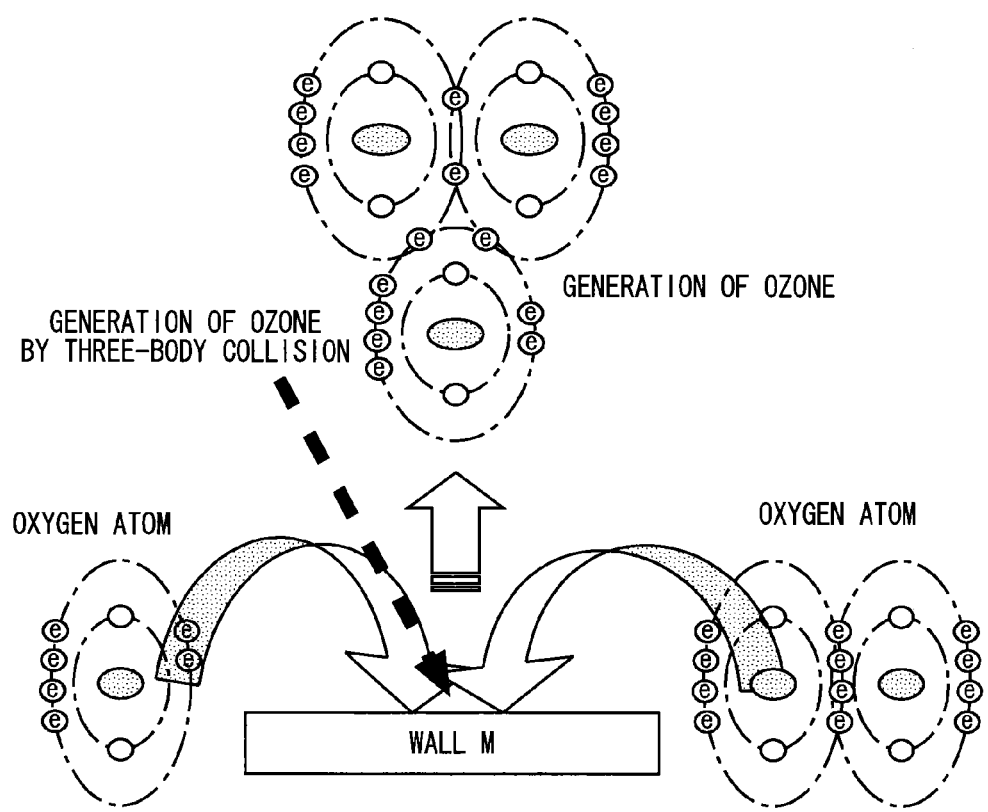
FIG. 10 schematically illustrates generation of ozone by using a combination of a nitrogen-added raw material oxygen gas and a conventional ozone generator.

FIG. 8 illustrates a detailed configuration of the nitrogen-free ozone generator 1. As shown in FIG. 8, in an embodiment in which two high voltage electrodes 1*a* share one ground electrode 1*b*, a plurality of electrode cells, each including a pair of high voltage electrodes 1*a* and a ground electrode 1*b*, are stacked one above another.

Each of the high voltage electrodes 1*a* have dielectric layers 1*c* formed on both sides thereof. Out of the two dielectric layers 1*c* formed on both sides, to the surface (discharge surface) of one dielectric layer 1*c* located on the ground electrode 1*b* side is applied a photocatalyst layer 1*d*, and on the surface of the other dielectric layer 1*c* located opposite to the ground electrode 1*b* is provided a high-pressure cooling plate 45 serving as a cooling path part. The ozone generator outer frame 1×, the high-pressure cooling plate 45, and a connecting block 49 described later are made of a metal material.

Each of the ground electrodes 1*b* has photocatalyst layers 1*d* applied to both sides and a space between the photocatalyst layer 1*d* applied onto the dielectric layer 1*c* of the high-voltage electrode 1*a* and the photocatalyst layer 1*d* applied onto the ground electrode 1*b* serves as a discharge space 46. Accordingly, an ozone gas 996 is generated by the photocatalyst effect of the aforementioned photocatalyst layers 1*d* in the discharge space 46, using a raw material gas 995 supplied from the MFC 3 via the raw material inlet 38 provided in the ozone generator outer frame 1×.

As for the plurality of high pressure cooling plates 45 and the ground electrodes 1*b*, a high-pressure cooling plate 45 and a ground electrode 1*b* that are adjacent to each other are connected via a connecting block 49. The connecting block 49 is provided so as to connect an end region of the high-pressure cooling plate 45 and an end region of the ground electrode 1*b*.

The connecting blocks 49, the high pressure cooling plates 45, and the ground electrodes 1*b* are each internally provided with a cooling water flow path that allows circulation of the low-temperature cooling water 33. It is thus possible to cause the low-temperature cooling water 33 obtained from the outside of the nitrogen-free ozone generator 1 to circulate in the cooling water flow paths of the connecting blocks 49, the high pressure cooling plates 45 constituting a cooling path part, and the ground electrodes 1*b*, via the cooling water inlet/outlet 34 (cooling medium inlet/outlet) provided in the ozone generator outer frame 1×. As a result, the high voltage electrodes 1*a* located in the vicinity of the high pressure cooling plates 45 and the ground electrodes 1*b* can be effectively cooled.

As shown in FIG. 8, in the nitrogen-free ozone generator 1 of the present embodiment, the cooling water inlet/outlet 34, the raw material inlet 38, the ozone gas outlet 39, and the high-voltage terminal accommodating part 20 (the high-voltage terminal PH) are gathered in a top surface portion 1×u (a predetermined constituent surface) of the ozone generator outer frame 1×.

In the case of such a configuration, another form may be used in which a heat insulating layer is selectively formed only in a heat insulating layer forming region 48 shown in FIG. 8, which covers only the top surface portion 1×u, rather than the form as shown in FIG. 5 in which the heat insulating layer 8 is formed so as to cover substantially the entire surface of the ozone generator outer frame 1×.

With the other form, it is possible to provide the effect of generating a large amount of ozone by maintaining the internal temperature of the ozone generator outer frame 1× at a low temperature by allowing the heat insulating action to effectively take place in the cooling water inlet/outlet 34, which serves as an inlet and outlet of cooling water supplied from the low-temperature cooling water system 30, and in a region in the vicinity of the cooling water inlet/outlet 34.

In addition, condensation can be prevented by allowing the heat insulating action to effectively take place in the cooling water inlet/outlet 34, the raw material inlet 38, the ozone gas outlet 39, and the high-voltage terminal accommodating part 20 (the high-voltage terminal PH) where a difference in temperature between inside and outside of the ozone generator outer frame 1× is greater than in the other parts and condensation is more likely to occur, as well as in regions in the vicinity thereof.

As a result, it is possible, in the other form of the present embodiment, to provide the effect of generating a large amount of ozone with a minimum volume of the heat insulating layer 8, without causing condensation.

Application to Field of Semiconductor Technology

In the field of semiconductors, it is highly desired to form insulating films having a high-quality semiconductor oxide film formed thereon using a high-purity ozone gas composed of only nitrogen-free oxygen and an ozone gas. For this reason, nitrogen-free ozone generating apparatuses are considered as an essential requirement, and a more highly concentrated ozone gas is required as the nitrogen-free ozone gas supplied from an ozone generator. It is also desired to increase electrical insulation properties by further increasing the speed of forming oxide insulating films or by increasing the film thickness of oxide insulating films.

Accordingly, by applying the nitrogen-free ozone generating unit 7 of the present embodiment (including other forms) to semiconductor manufacturing technology, it is possible to form high-quality oxide insulating films in a relatively short period of time.

Although the present invention has been described in detail, the description given above is merely illustrative in all aspects, and thus the present invention is not limited thereto. It is to be understood that an unlimited number of modifications that are not illustrated here can be made without departing from the scope of the present invention.

The invention claimed is:

1. A nitrogen-free ozone generating unit, comprising:
    a nitrogen-free ozone generator comprising a photocatalytic material for generating ozone on a discharge surface and is configured to generate an ozone gas;
    an ozone power source supplying high voltage to said nitrogen-free ozone generator; and
    a controller associated with said ozone generator,
    wherein:
    said controller comprises:
        a flow rate detection/adjusting unit comprising a mass flow controller configured to control a raw-material-gas flow rate supplied to said nitrogen-free ozone generator; and
        a pressure detecting/adjusting unit comprising an auto pressure controller configured to automatically control an internal pressure that is a pressure inside said nitrogen-free ozone generator;
    said nitrogen-free ozone generating unit has an integrated structure of said nitrogen-free ozone generator, said ozone power source, and said controller;
    said nitrogen-free ozone generator further comprises:
        a high-voltage terminal configured to receive said high voltage from said ozone power source;
        a cooling medium inlet/outlet for supplying and discharging a low-temperature cooling medium having a temperature of 15° C. or less that is obtained from outside;
        a high voltage electrode to which said high voltage is applied via said high-voltage terminal and that has at least one primary surface defined as said discharge surface;
        a photocatalyst layer made of said photocatalytic material and provided on said discharge surface side of said high voltage electrode;
        a cooling path part provided in a vicinity of said high voltage electrode and configured to allow circulation of said cooling medium supplied therein via said cooling medium inlet/outlet;
        an accommodating part configured to accommodate therein said high voltage electrode, said photocatalyst layer, and said cooling path, said cooling medium inlet/outlet being formed in a predetermined constituent surface constituting part of a peripheral portion of said accommodating part, and said high-voltage terminal being provided to pass through said peripheral portion of said accommodating part;
        a heat insulating layer made of a heat insulating material and formed to cover at least said predetermined constituent surface of said accommodating part, such that the heat insulating layer directly contacts said predetermined constituent surface;
        a raw material gas inlet part for supplying a raw material gas from outside via said flow rate detection/adjusting means; and
        an ozone gas outlet part for outputting a generated ozone gas to outside via said pressure detecting/adjusting means;
    said raw material gas inlet part and said ozone gas outlet part are formed in said predetermined constituent surface, and said high-voltage terminal is formed to pass through said predetermined constituent surface; and
    said heat insulating layer is formed to selectively cover and directly contact only said predetermined constituent surface.

2. The nitrogen-free ozone generating unit according to claim 1, wherein said cooling medium comprises a low-temperature cooling medium whose temperature when supplied to said accommodating part of said nitrogen-free ozone generator is able to be set to 5° C. or less, and is configured to cool said nitrogen-free ozone generator.

3. The nitrogen-free ozone generating unit according to claim 1, further comprising a high-voltage terminal accommodating part configured to accommodate a primary portion of said high-voltage terminal in a predetermined space,
    wherein said high-voltage terminal accommodating part comprises a purge gas supply inlet capable of supplying a purge gas to a predetermined space from outside, said purge gas adapted to have a dew point low enough to prevent condensation.

4. The nitrogen-free ozone generating unit according to claim 2, further comprising a high-voltage terminal accommodating part configured to accommodate a primary portion of said high-voltage terminal in a predetermined space,
    wherein said high-voltage terminal accommodating part comprises a purge gas supply inlet capable of supplying a purge gas to a predetermined space from outside, said purge gas adapted to have a dew point low enough to prevent condensation.

5. The nitrogen-free ozone generating unit according to claim 1, wherein the heat insulating layer does not cover or directly contact the high-voltage terminal.

6. The nitrogen-free ozone generating unit according to claim 3, wherein the heat insulating layer does not cover or directly contact the high-voltage terminal accommodating part.

7. A nitrogen-free ozone generating unit, comprising:
    a nitrogen-free ozone generator comprising a photocatalytic material for generating ozone on a discharge surface and is configured to generate an ozone gas;
    an ozone power source supplying high voltage to said nitrogen-free ozone generator; and
    a controller associated with said ozone generator,
    wherein:
    said controller comprises:
        a flow rate detection/adjusting unit comprising a mass flow controller configured to control a raw-material-gas flow rate supplied to said nitrogen-free ozone generator; and
        a pressure detecting/adjusting unit comprising an auto pressure controller configured to automatically control an internal pressure that is a pressure inside said nitrogen-free ozone generator;

said nitrogen-free ozone generating unit has an integrated structure of said nitrogen-free ozone generator, said ozone power source, and said controller; and said nitrogen-free ozone generator further comprises:

a high-voltage terminal configured to receive said high voltage from said ozone power source;

a cooling medium inlet/outlet for supplying and discharging a low-temperature cooling medium having a temperature of 15° C. or less that is obtained from outside;

a high voltage electrode to which said high voltage is applied via said high-voltage terminal and that has at least one primary surface defined as said discharge surface;

a photocatalyst layer made of said photocatalytic material and provided on said discharge surface side of said high voltage electrode;

a cooling path part provided in a vicinity of said high voltage electrode and configured to allow circulation of said cooling medium supplied therein via said cooling medium inlet/outlet;

an accommodating part configured to accommodate therein said high voltage electrode, said photocatalyst layer, and said cooling path, said cooling medium inlet/outlet being formed in a predetermined constituent surface constituting part of a peripheral portion of said accommodating part, and said high-voltage terminal being provided to pass through said peripheral portion of said accommodating part; and a heat insulating layer made of a heat insulating material and formed to cover at least said predetermined constituent surface of said accommodating part, such that the heat insulating layer directly contacts said predetermined constituent surface; and said heat insulating layer is formed to cover and directly contact substantially an entire surface of said peripheral portion of said accommodating part.

8. The nitrogen-free ozone generating unit according to claim 7, further comprising a high-voltage terminal accommodating part configured to accommodate a primary portion of said high-voltage terminal in a predetermined space, wherein said high-voltage terminal accommodating part comprises a purge gas supply inlet capable of supplying a purge gas to a predetermined space from outside, said purge gas adapted to have a dew point low enough to prevent condensation.

9. The nitrogen-free ozone generating unit according to claim 7, wherein the heat insulating layer does not cover or directly contact the high-voltage terminal.

10. The nitrogen-free ozone generating unit according to claim 8, wherein the heat insulating layer does not cover or directly contact the high-voltage terminal accommodating part.

* * * * *